United States Patent
Andreoli et al.

(10) Patent No.: US 8,505,715 B2
(45) Date of Patent: Aug. 13, 2013

(54) CHAIN FOR ARTICLES CONVEYOR

(75) Inventors: Andrea Andreoli, Modena (IT); Davide Calciolari, Modena (IT)

(73) Assignee: Rexnord Marbett S.R.L., Correggio (Reggio Emilia) (IT)

( * ) Notice: Subject to any disclaimer, the term of this patent is extended or adjusted under 35 U.S.C. 154(b) by 50 days.

(21) Appl. No.: 13/121,997

(22) PCT Filed: Oct. 30, 2009

(86) PCT No.: PCT/EP2009/064409
§ 371 (c)(1),
(2), (4) Date: Jun. 23, 2011

(87) PCT Pub. No.: WO2010/049537
PCT Pub. Date: May 6, 2010

(65) Prior Publication Data
US 2011/0247923 A1    Oct. 13, 2011

(30) Foreign Application Priority Data

Oct. 30, 2008  (IT) ............................... MI2008A1917

(51) Int. Cl.
*B65G 17/06*    (2006.01)
(52) U.S. Cl.
USPC .......................................... 198/852; 198/853
(58) Field of Classification Search
USPC ................... 198/852, 851, 853, 831
See application file for complete search history.

(56) References Cited

U.S. PATENT DOCUMENTS

| | | | | |
|---|---|---|---|---|
| 1,800,663 | A | * | 4/1931 | Schade .......................... 198/853 |
| 4,524,865 | A | * | 6/1985 | von Hofen ..................... 198/852 |
| 5,803,236 | A | * | 9/1998 | Wahren ......................... 198/852 |
| 6,125,996 | A | * | 10/2000 | Cornet et al. ................. 198/852 |
| 6,173,832 | B1 | * | 1/2001 | Cockayne ..................... 198/852 |

(Continued)

FOREIGN PATENT DOCUMENTS

| | | |
|---|---|---|
| EP | 0 083 119 A | 7/1983 |
| EP | 0 910 540 A | 4/1999 |

(Continued)

OTHER PUBLICATIONS

The International Search Report as mailed on Dec. 22, 2009 for International Application No. PCT/EP2009/064409.

*Primary Examiner* — Gene Crawford
*Assistant Examiner* — Keith R Campbell
(74) *Attorney, Agent, or Firm* — Quarles & Brady LLP

(57) ABSTRACT

A conveyor chain (10) for conveying articles is proposed. The chain includes a sequence of links (20), each link defining a support surface (42, 130) for the articles to be conveyed. Each link is hinged to a preceding link in the chain by means of a pin (80) having a first axis and is pivotable with respect to the preceding link by means of a sleeve (90) having a second axis perpendicular to the first axis. Said sleeve is coaxially rotatable with respect to a gudgeon (100) which is coaxial to the second axis and crossed by the pin. Said gudgeon is coupled with a plate-like element (120) adapted to be hold into a seat (47) of the link in such a way to be flush with said support surface. The shape of the plate-like elements and the coupling thereof with the respective gudgeons is such that the plate-like element associated with a link extends to cover the gudgeon of the subsequent link in the chain when the chain configuration is substantially planar.

13 Claims, 2 Drawing Sheets

(56) References Cited

U.S. PATENT DOCUMENTS

| | | | |
|---|---|---|---|
| 6,209,716 B1 * | 4/2001 | Bogle et al. | 198/852 |
| 6,247,583 B1 * | 6/2001 | Coen et al. | 198/852 |
| 6,250,459 B1 * | 6/2001 | Coen et al. | 198/852 |
| 6,736,259 B1 * | 5/2004 | Funabashi | 198/852 |
| 6,758,328 B2 * | 7/2004 | Arai et al. | 198/852 |
| 7,044,290 B2 * | 5/2006 | Garbagnati et al. | 198/852 |

FOREIGN PATENT DOCUMENTS

| | | |
|---|---|---|
| EP | 0 995 698 A | 4/2000 |
| EP | 1 375 391 A | 1/2004 |
| FR | 2 513 975 A | 4/1983 |

* cited by examiner

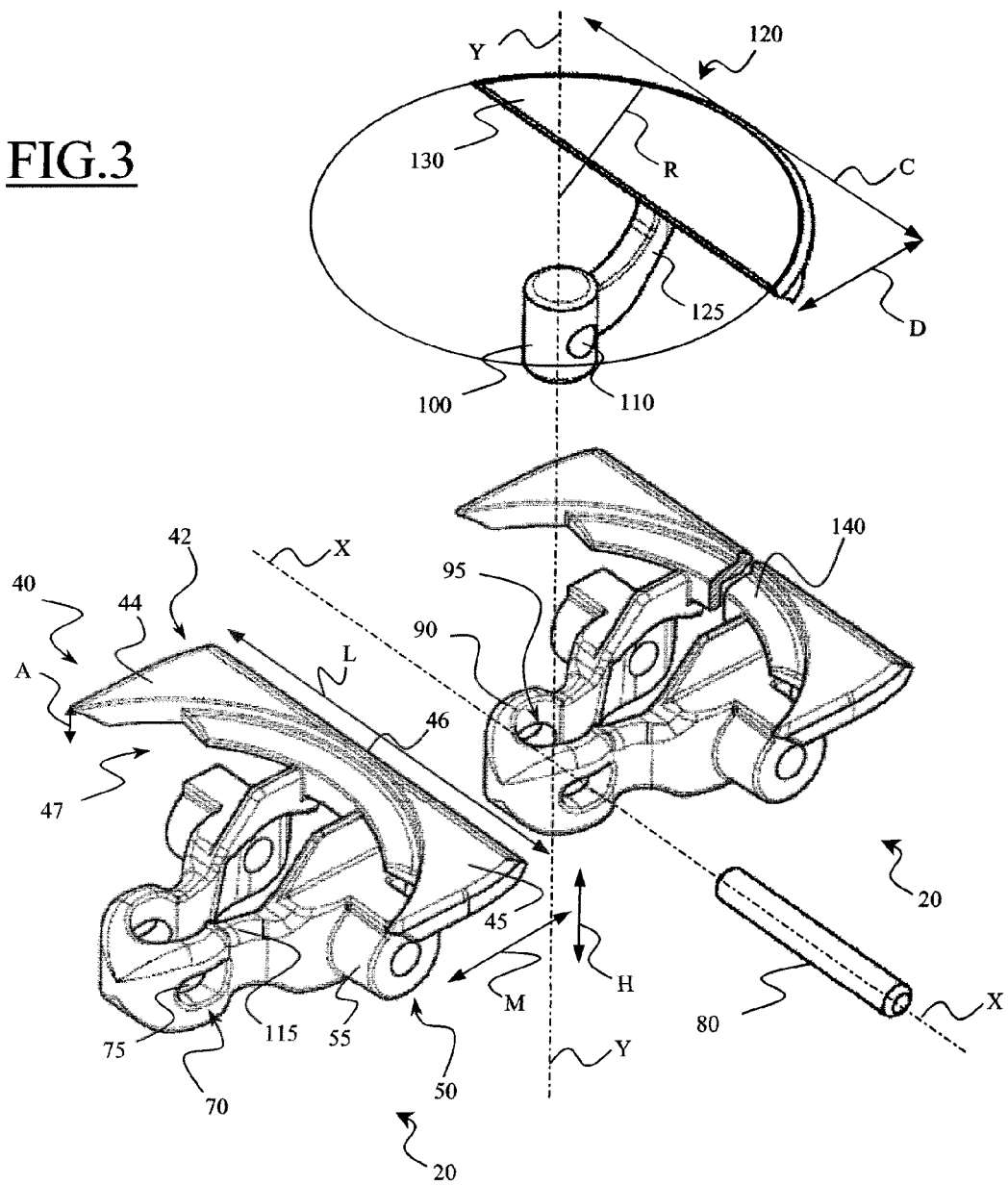
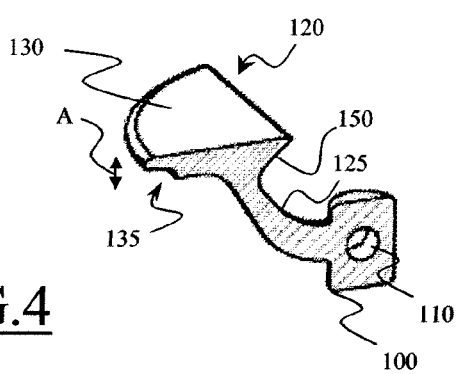

CHAIN FOR ARTICLES CONVEYOR

CROSS-REFERENCE TO RELATED APPLICATIONS

The present application claims the benefit of Italian Patent Application No. MI2008A1917 filed Oct. 30, 2008, and is a national phase of PCT International Application No. PCT/EP2009/064409 filed on Oct. 30, 2009, both applications are incorporated herein by reference.

The present invention relates in general to the field of articles conveyors, particularly to chain conveyors, and more specifically the invention concerns a conveyor chain for conveying articles of the type including a plurality of links, wherein each link defines a support surface for the articles to be conveyed.

As it is known, the conveyor chains of the specified type have to satisfy the need of following paths being not only rectilinear but also including more or less pronounced bends.

Several of the conveyor chains presently used have the drawback that, in correspondence of a bend—and in particular in correspondence of the bend extrados—open spaces form between adjacent links, which not only originate a discontinuity of the useful articles support surface, but may also cause damages or accidents, if at the end of the bend such spaces close on a foreign object or on a finger of an operator, which meanwhile have occupied the above-said open spaces.

For this reason, conveyor chains have been proposed that include plates having an arc-shaped profile brought by the links of the chain, being apt to engage in corresponding arc-shaped seats, brought by the adjacent links. In this way, in correspondence of a bend, no open space is formed, since the arc-shaped plate of each link is able to pivot in the corresponding arc-shaped seat of the adjacent link.

An example of a conveyor chain of such type, named "zero-gap" in jargon, is disclosed in the European Patent Application EP 926082. In particular, in such conveyor chain each link includes a support surface having an arc-shaped seat and a gudgeon having a plate-like head with an arc-shaped profile; the plate-like head is flush with the support surface and extends along the link to engage in the arc-shaped seat of the adjacent link in the chain.

However, such conveyor chain, though being able to avoid the formation of open spaces in the support surface during the bends, does not result to be advantageous under other aspects. In fact, in a conveyor chain of this type, the longitudinal dimensions—i.e., along the chain sliding direction—of the individual links has to be necessarily high, since the support surface of each link has to be sufficiently wide for accommodating the plate-like head of the corresponding gudgeon. Since the longitudinal dimensions of the links are closely correlated to the minimum pitch obtainable between adjacent links of the conveyor chain, a conveyor chain of the type described in the European Patent Application EP 926082 can not have a reduced pitch.

A conveyor chain similar to the previous one is also described in the European Patent EP 910540.

Another example of zero-gap conveyor chain is provided in the European Patent Application EP 1375391, wherein the gudgeon associated with the link of the chain is connected to a plate-like portion having an arc-shaped profile provided with a rear extension being apt to act as a connecting support surface between the same plate-like portion and the support surface provided by the previous link.

The fact of not having a reduced pitch results to be a drawback in all those applications that require a very small pitch between adjacent links. In particular, the minimum radius of curvature of the path that the links of the chain can accomplish is determined by the pitch between the same links. If the pitch between the links results to be too high, only bends having a high radius of curvature can be accomplished by the conveyor chain executed.

Another drawback due to not having a sufficiently small pitch between the links, relates to the movement of the conveyor chain. In fact, in many applications the links of the conveyor chain are moved through a gear-rack mechanism, and the advance fluidity of the chain results to be strictly related to the pitch between the links of the chain. In particular, the advance of the links along the path is jerkily, the distance covered at each jerk depending on the pitch between the links. In a conveyor chain having a high pitch, the advance fluidity results to be low, and the jerkily movement of the conveyor chain results quite pronounced. This could cause the fall of the articles conveyed by the chain, particularly if such articles are light.

Besides, in order to respect the new security rules, the desire or the need arises of replacing the non zero-gap conveyor chains that are now installed in already existing conveyors, with versions thereof that do not have open spaces between the links during the bends of the path. In these cases, however, it should be feasible to replace the conveyor chains already installed by zero-gap conveyor chains having the same structural size, and in particular maintaining the same link width and the same pitch.

The problem that is at the basis of the present invention is hence devising a conveyor chain able to offer a support surface that has no open spaces between the links in correspondence of bends, but that at the same time has structural features such as to overcome the drawbacks cited in connection with the conveyor chain known in the art. In particular, it is an object of the present invention to devise a conveyor chain of the above-mentioned type having a high value of the ratio width/pitch between the links.

The aspects of the solution according to an embodiment of the present invention are set forth in the independent claim.

Advantageous embodiments are set forth in the dependent claims.

In particular, an aspect of the present invention relates to a conveyor chain for conveying articles. Said conveyor chain comprises a sequence of links; each link defines a support surface for the articles to be conveyed. Each link is hinged to a preceding link in the chain by means of a pin having a first axis and is articulated with respect to the preceding link by means of a sleeve having a second axis perpendicular to the first axis. Said sleeve is coaxially rotatable with respect to a gudgeon which is coaxial to the second axis and crossed by the pin. Said gudgeon is coupled with a plate-like element adapted to be received into a seat of the link in such a way to be flush with said support surface. The shape of the plate-like elements and the coupling thereof with the respective gudgeons is such that the plate-like element associated with a link extends until covering the gudgeon of the subsequent link in the chain when the chain configuration is substantially planar.

The solution according to one ore more embodiments of the invention, as well as further features and corresponding advantages, will be better understood with reference to the following detailed description, given purely by way of a non-restrictive indication, to be read in conjunction with the accompanying drawings. In this respect, it is expressly meant that the figures are not necessarily in scale and that, unless where contrarily indicated, they are simply used for conceptually showing the described structures and procedures. In particular:

FIG. 3 is an exploded perspective view of a particular of the conveyor chain of FIGS. 1 and 2.

FIG. 4 is a perspective view in section of a further particular of the conveyor chain of FIGS. 1 and 2.

Figure 1:
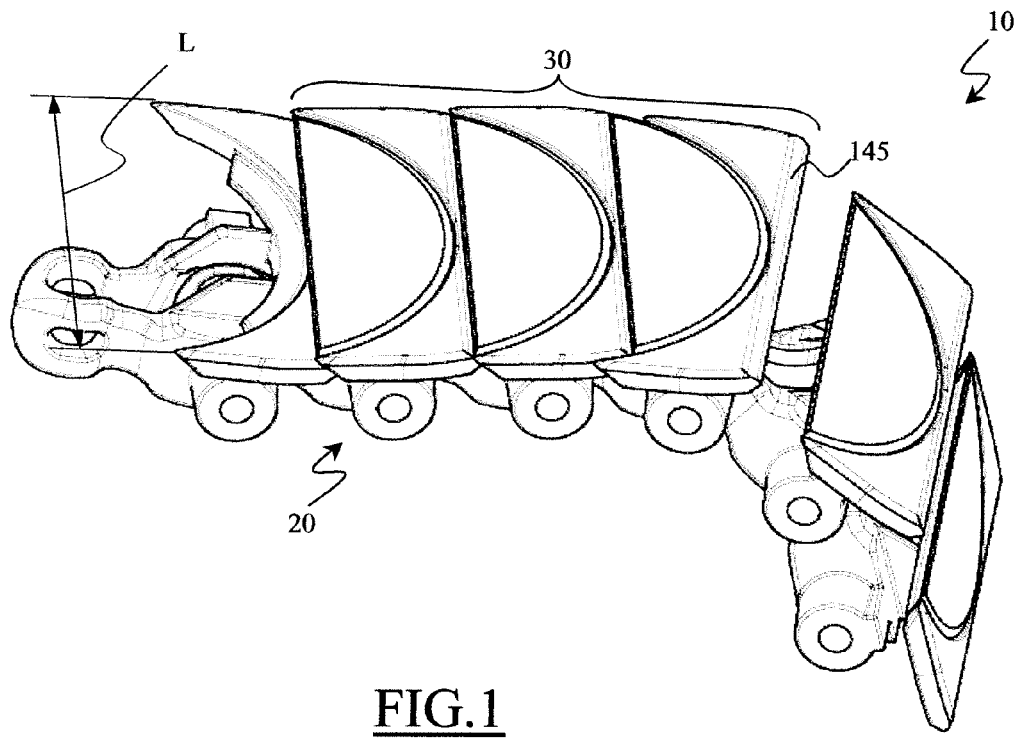
FIG. 1 is a perspective view from above of a conveyor chain for conveying articles according to an embodiment of the present invention.
Figure 2:
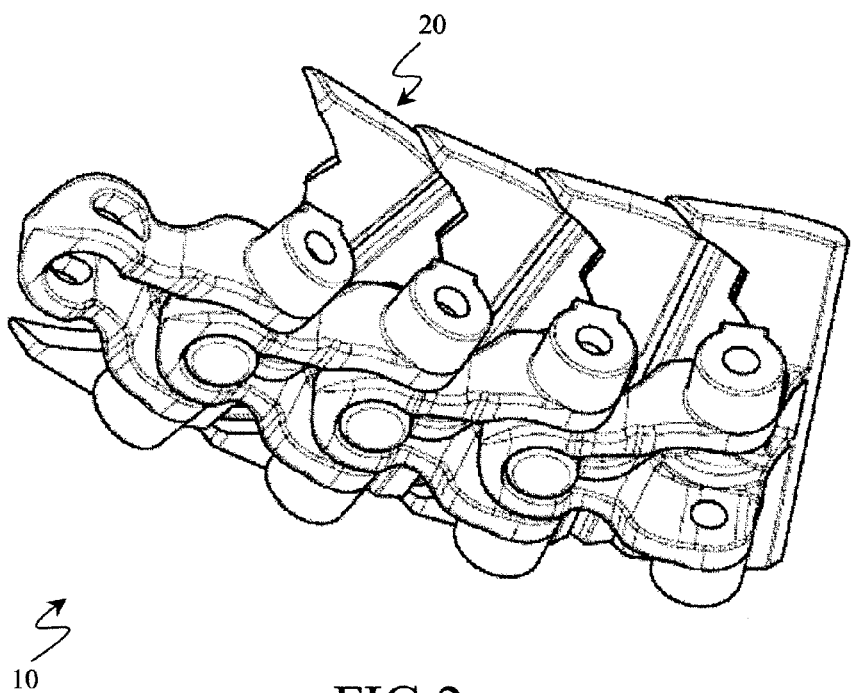
FIG. 2 is a perspective view from below of the conveyor chain of FIG. 1.

With reference to the drawings, FIG. 1 is a perspective view from above of a conveyor chain for conveying articles, globally indicated with the reference numeral 10, according to an embodiment of the present invention. FIG. 2 instead is a perspective view of the same conveyor chain 10 but from below.

The conveyor chain 10 has a width L and includes a plurality of links, indicated in the figures with the reference numeral 20.

Adjacent links 20 in the chain define a corresponding active branch 30 that has a useful support surface being substantially flat for the articles to be conveyed.

Making reference to FIG. 3, showing an exploded perspective view of a particular of the conveyor chain 10—corresponding to a pair of adjacent links 20 in the chain—, each link 20 includes a plate-like portion 40 having predetermined thickness, indicated in figure with A, having a width L and a length M. The plate-like portion 40 upperly provides a flat support surface 42 of the articles to be conveyed, being part of the surface of the active branch 30.

According to an embodiment of the present invention, the support surface 42 is formed by two support portions 44, 45, coupled to each other through a connection element 46, for example a thin jumper. In particular, the plate-like portion 40 is shaped in such a way to include an arc-shaped seat 47 extending for all the width L and for all the length M, so that each support portion 44, 45 has a shape similar to that of a right-angled triangle, whit a first cathetus having a length M, a second cathetus having a length being equal to about half of the width L and a curvilinear hypothenuse defined by the arc-shaped seat 47.

Each link 20 includes at opposite ends—in the sense of the advance of the conveyor chain 10—on one hand two lateral appendixes, both indicated with 50, connected to form a fork, and on the other hand a central appendix 70, being apt to be inserted between the lateral appendixes 50 of the adjacent link 20 in the conveyor chain 10. The central appendix 70 is provided with slots 75, while the lateral appendixes 50 are provided with hollow cylindrical projections 55.

Two adjacent links 20 in the conveyor chain 10 are hinged to each other through a pin 80, having X-X axis being transverse and parallel to the support surface 42. The pin 80 crosses the lateral appendixes 50 and the central appendix 70, and in particular it crosses the hollow cylindrical projections 55 and the slots 75.

The adjacent links 20, in addition to being hinged to each other through the pin 80, are also flexible, that is they are able to rotate the one in respect to the other around a Y-Y axis being perpendicular to the X-X axis of the pin 80 and perpendicular to the support surface 42.

To this purpose, the central appendix 70 includes a cylindrical sleeve 90, having Y-Y axis, that has a cylindrical coaxial seat 95 being apt to accommodate a cylindrical gudgeon 100. The gudgeon 100 is crossed by a transverse hole 110. When the gudgeon is received in the cylindrical seat 95 of the sleeve 90, the transverse hole 110 results to be aligned both to the slots 75 of the central appendix 70 of the link 20, and to the hollow cylindrical projections of the adjacent link 20, in such a way to be crossed by the pin 80 that hinges the two links.

The sleeve 90 of the central appendix 70 is connected to the lateral appendixes 50 (of the same link 20) through two ridges 115 that as a whole form a "V"-shaped structure, with the sleeve 90 at the vertex and each lateral appendix 50 at a respective end.

In the exemplary embodiment shown, the plate-like portion 40, the lateral appendixes 50, the sleeve 90 and the ridges 115 form a single monolithic piece, having a width H, preferably obtained by injection moulding of a plastic material.

According to an embodiment of the present invention, the gudgeon 100 is connected to a plate-like element, globally indicated with 120, through a protruding support arm 125. The plate-like element 120 is provided with a plane top surface 130. According to an embodiment of the present invention, the protruding arm 125 is structured in such a way that the plate-like element 120 is spaced apart from the gudgeon 100 which is connected thereto; thus, the plate-like element does not cover the gudgeon 100 which is connected thereto. In other words, the plate-like element 120 is connected to the gudgeon 100 through a cantilevered arm. When the gudgeon 100 is received in the cylindrical seat 95 of the sleeve 90, the plate-like element comes to be flush with the support surface 42 of the plate-like portion 40. In this way the top surface 130 of the plate-like element 120 and the support surface 42 of the plate-like portion 40 result to be coplanar, and both contribute to form the support surface for the articles to be conveyed on the conveyor chain 10. Additionally, according to the present invention, the extension of the protruding arm 125 is such that the plate-like element 120 is superimposed onto the sleeve 90 of the adjacent link 20 in the conveyor chain 10 and the pin 80 hinging the two links to each other. In this way, the gudgeon 100 being inserted in the sleeve 90 of each link 20 results to be covered by the plate-like element 120 associated with the preceding link 20.

According to an embodiment of the present invention, the plate-like element 120 has the shape of a circle segment, having a radius R and having a centre on the Y-Y axis, that is on the axis of the gudgeon 100. In particular, the plate-like element 120 has a base having a length C, extending in the sense of the width of the conveyor chain and having a size substantially equal to the width L, and an height D, lower than the radius R. The plate-like element 120 has a width B being substantially equal to the width A of the plate-like portion 40. As depicted in FIG. 4, representing a perspective view in section of the assembly gudgeon/plate-like element/protruding arm, the plate-like element 120 also includes an arc-shaped groove 135 being arranged in a peripheral portion—proximate to the arc-shaped end of the plate-like element 120.

In the exemplificative embodiment of the invention shown in the figures, the gudgeon 100, the plate-like element 120 and the protruding arm 125 form a single monolithic piece, preferably obtained by injection moulding of a plastic material. In alternative embodiments, the plate-like element 120 and the protruding arm 125 (with the gudgeon 100) could be made as separate parts mechanically coupleable, or the plate-like element 120 and the protruding arm 125 could form a separate part mechanically coupleable to the gudgeon 100.

According to an embodiment of the present invention, also the arc-shaped seat 47 of the plate-like portion 40 has the shape of a circle segment, having a radius R and having the centre on the Y-Y axis; moreover, the seat 47 includes a arc-shaped lip support element 140, having thickness lower than the thickness A of the plate-like element 140, and being apt to cooperate with the plate-like element 120 for being received in the groove 135 when the gudgeon 100 is received in the cylindrical seat 95 of the sleeve 90. As a consequence, the plate-like element 120 is received in the seat 47 of the plate-like portion 40, and it is free to rotate, integrally to the gudgeon 100 and to the pin 80 that crosses it, around the Y-Y axis. For allowing the plate-like element 120 rotating with respect to the plate-like portion 40, the groove 135 of the plate-like element 120 has a grater extension than the lip support element 140.

As a consequence, in the conveyor chain 10, on the support surface for the articles to be conveyed the support surfaces 42 of the plate-like portions 40 of the links 20 follow the top surfaces 130 of the plate-like elements 120, coplanar to each other.

In operation, the support surface of the conveyor chain 10 remains substantially continuous. In fact, when adjacent links 20 rotate one with respect to the other, one link 20 rotates around the Y-Y axis without determining the opening of unwanted spaces.

Moreover, the support surface of the conveyor chain 10 remains substantially continuous even in case of pronounced bends between adjacent links 20, i.e. in case the link 20 rotates with respect to the adjacent link around the X-X axis of the pin 80 hinging them with a relatively small angle. In particular, according to an embodiment of the present invention, the connection element 46 joining the support portions 44, 45 of the plate-like portion 40 has a chamfered profile—shown in FIG. 1 with the reference numeral 145—and the base of the plate-like element 120 has a corresponding chamfered profile—shown in FIG. 4 with the reference numeral 150. The chamfered profile 145 of the plate-like portion 40 of a link 20 interacts with the chamfered profile 150 of the plate-like element 120 of the adjacent link 20, allowing the two links to rotate around the pin 80 hinging them with an (relatively small) angle that can be both positive and negative, that is allowing both womb and back bending.

Unlike the known solutions, the pitch obtainable between adjacent links 20 in the chain, defined as the distance between the centres of the sleeves 90 of the links 20, is reduced. This advantageous feature results form the peculiar structure of the plate-like element 120, from the way it is connected to the gudgeon 100 through the protruding support arm 125, and from the reduced shape of the support surface 42 of the plate-like portion 40. In fact, unlike the known solutions, the support surface results to be almost entirely determined by the top surfaces 130 (circle-segment shaped) of the plate-like elements 120, since the support surface 42 of the plate-like portion 40 of each link 20 is formed by little triangular-shaped support portions 44, 45.

It is pointed out that since the plate-like element 120 of a link 20 is structured in such a way to overlie the gudgeon 100 of the subsequent link 20 in the conveyor chain 10—but not the gudgeon 100 of the link belonging thereto—differently from the known conveyor chains it is not necessary to have any rear extension of the plate-like element 120 acting as support surface between the circle segment of the same plate-like element 120 and the support surface 42 of the plate-like portion 40 of the preceding link 20 in the conveyor chain 10. It should be noted that in the known conveyor chains, the plate-like portion of each link is provided with a breaking for receiving said rear extension of the plate-like element of the following link, in order to maintain the continuity of the support surface when the chain is subject to womb and back bending. Thanks to the proposed solution, said breaking is no longer necessary, and the two support portions 44, 45 are directly coupled to each other through the connection element 46.

In this way it is possible to build a conveyor chain 10 having a relatively high width/pitch ratio, solving the problems cited in the introduction of the present document. For example, with the proposed solution it is possible to build conveyor chains having width/pitch ratios from 2 up to 3.

Naturally, a person skilled in the art, in order to satisfy local and specific requirements, may apply many modifications and alterations to the above-described solution. More specifically, although such solution has been described with a certain degree of particularity with reference to preferred embodiments thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a matter of general design choice.

The invention claimed is:

1. A conveyor chain for conveying articles, comprising a sequence of links, each link having a link width defining a support surface for the articles to be conveyed, and wherein each link is hinged to a preceding link in the chain by means of a pin having a first axis and is pivotable with respect to the preceding link by a sleeve having a second axis perpendicular to the first axis, said sleeve being coaxially rotatable with respect to a gudgeon which is coaxial to the second axis and crossed by the pin, a first plate fixed relative to said sleeve and extending along the link width, said first plate forming at least part of said support surface and defining a seat, said gudgeon being coupled with a second plate disposed in the seat and flush with said support surface, wherein the second plate and the coupling thereof with the gudgeons is such that the second plate associated with one of said links of said sequence of links extends to cover a gudgeon of a subsequent link of said sequence of links when the one of said links and subsequent link are substantially planar.

2. The conveyor chain of claim 1, wherein the second plate has the shape of a circle segment having a base of a length substantially equal to a width (L) of the conveyor chain.

3. The conveyor chain of claim 2, wherein the plate-like element is coupled with the gudgeon by means of a support arm, said support arm having an extension such to outdistance the second plate from the gudgeon by an amount sufficient to allow that the plate-like element associated with a link extends to overlie the pin hinging said link with a subsequent link in the chain.

4. The conveyor chain of claim 2, wherein said circle segment is a segment of a circle having a first diameter greater than the width of the conveyor chain and centered on the second axis.

5. The conveyor chain of claim 4, wherein said seat has the shape of a circle segment having a second diameter substantially equal to the first diameter and centered on the second axis.

6. The conveyor chain of claim 1, wherein the support surface comprises a first surface of the first plate and a second surface of the second plate of the link integral to the gudgeon, said first plate defining said seat.

7. The conveyor of claim 6, wherein the second surface comprises a first lateral support portion and a second lateral support portion, said first and second lateral support portions being coupled to each other by means of a connection element.

8. The conveyor chain of claim 1, wherein said seat includes a support element and wherein said plate-like element includes a groove adapted to hold the support element.

9. The conveyor chain of claim 8, wherein said groove has an extension higher than an extension of the support element.

10. The conveyor chain of claim 2, wherein the ratio between the chain width and the pitch of the links is equal to or higher than 2.

11. A conveyor chain for conveying articles, said chain comprising:
- a sequence of links, each link defining a link width and including a sleeve;
- a pin extending through an opening formed through said sleeve and hinging each link to a preceding link in the chain, said pin having a first axis and being pivotable with respect to the preceding link by means of the sleeve having a second axis perpendicular to the first axis;
- a first plate fixed relative to said sleeve and extending along the link width, said first plate forming at least part of a support surface and defining a seat;
- a gudgeon coaxially rotatable with respect to the sleeve, said gudgeon being substantially coaxial with the second axis and crossed by the pin; and
- a second plate coupled with the gudgeon and received in said seat, said second plate being substantially flush with said support surface, the shape of the second plate and the coupling thereof with the gudgeon is such that the second plate associated with one of said links of said sequence of links extends over a gudgeon of a subsequent link of said sequence of links when the one of said links and subsequent link are substantially planar.

12. The conveyor chain of claim 1, in which said first plate defining an arc-shaped seat.

13. The conveyor chain of claim 11, in which said first plate defining an arc-shaped seat.

* * * * *

UNITED STATES PATENT AND TRADEMARK OFFICE
CERTIFICATE OF CORRECTION

PATENT NO. : 8,505,715 B2
APPLICATION NO. : 13/121997
DATED : August 13, 2013
INVENTOR(S) : Andreoli et al.

Page 1 of 1

It is certified that error appears in the above-identified patent and that said Letters Patent is hereby corrected as shown below:

In the Claims

Col. 6, claim 1, line 33, "gudgeons" should be changed to -- gudgeon --

Signed and Sealed this
Fifth Day of November, 2013

Teresa Stanek Rea
*Deputy Director of the United States Patent and Trademark Office*

UNITED STATES PATENT AND TRADEMARK OFFICE
CERTIFICATE OF CORRECTION

PATENT NO. : 8,505,715 B2  Page 1 of 1
APPLICATION NO. : 13/121997
DATED : August 13, 2013
INVENTOR(S) : Andreoli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 104 days.

Signed and Sealed this
Fifteenth Day of September, 2015

Michelle K. Lee
*Director of the United States Patent and Trademark Office*